Feb. 2, 1943.    C. J. MADDOX    2,309,855
SLOPE REDUCING BOARD
Filed May 16, 1942    2 Sheets-Sheet 1
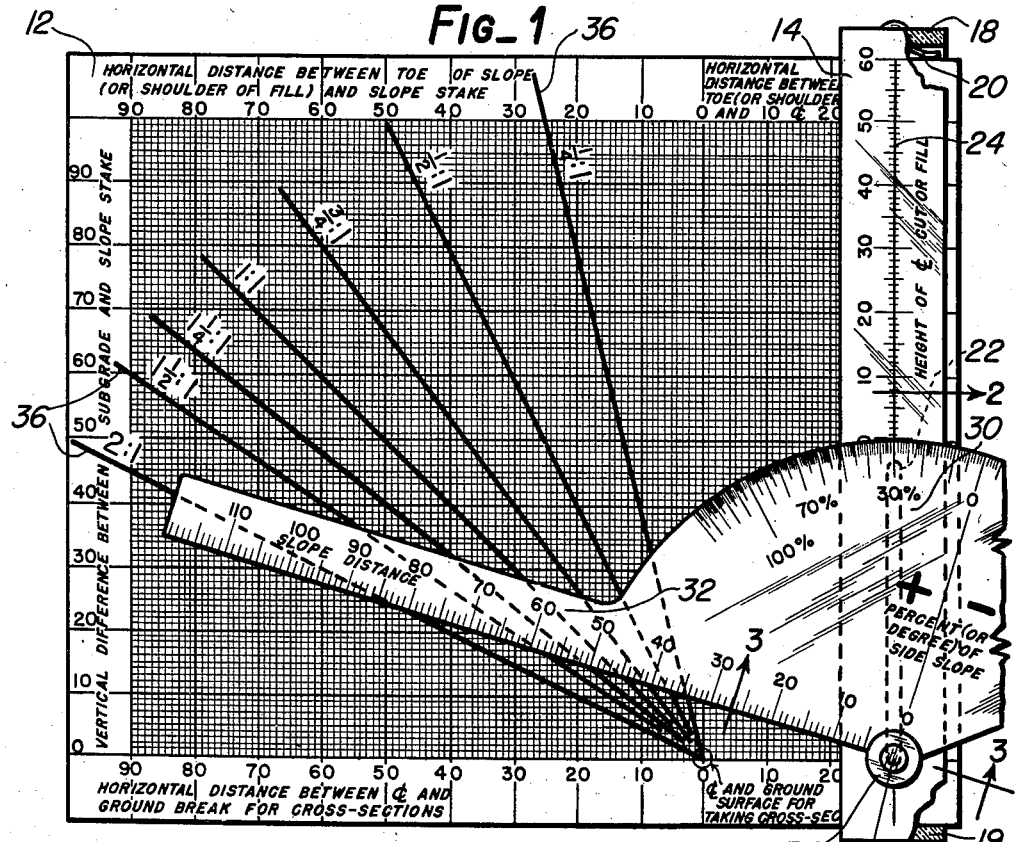
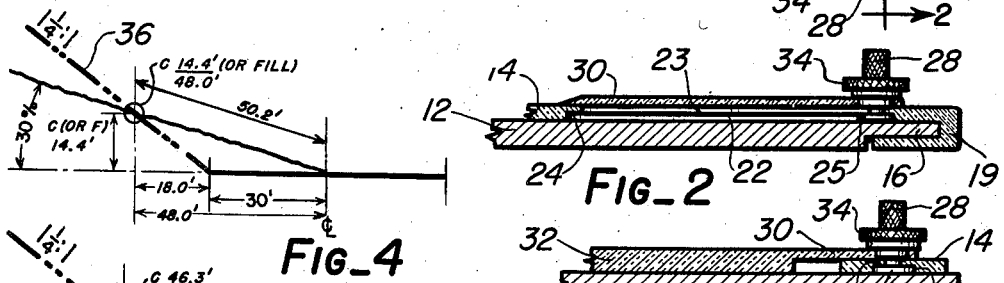
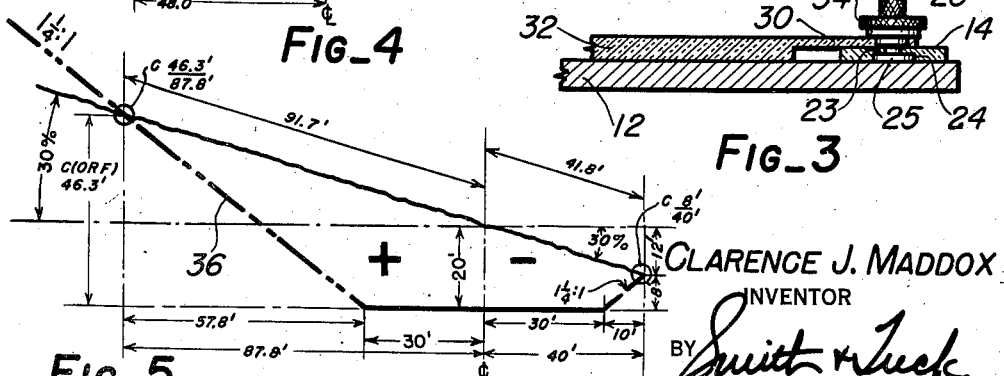
CLARENCE J. MADDOX
INVENTOR
BY
ATTORNEYS Feb. 2, 1943. C. J. MADDOX 2,309,855
SLOPE REDUCING BOARD
Filed May 16, 1942 2 Sheets-Sheet 2
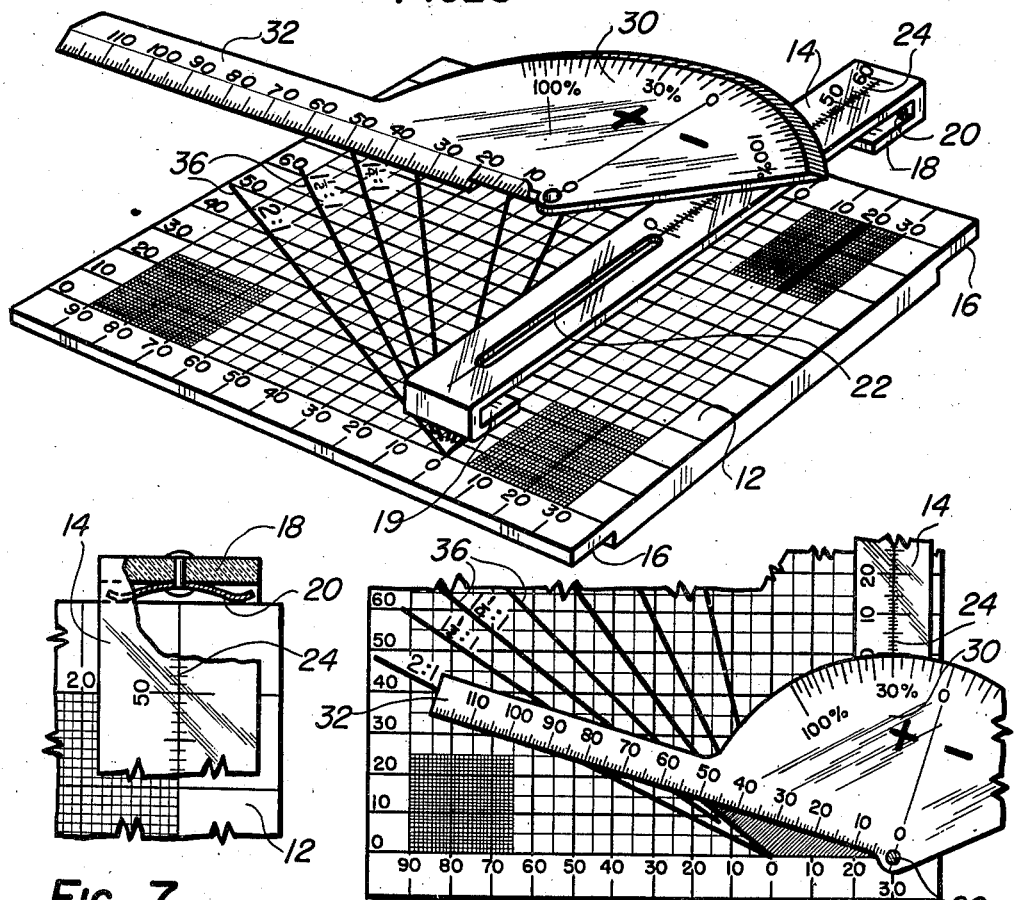
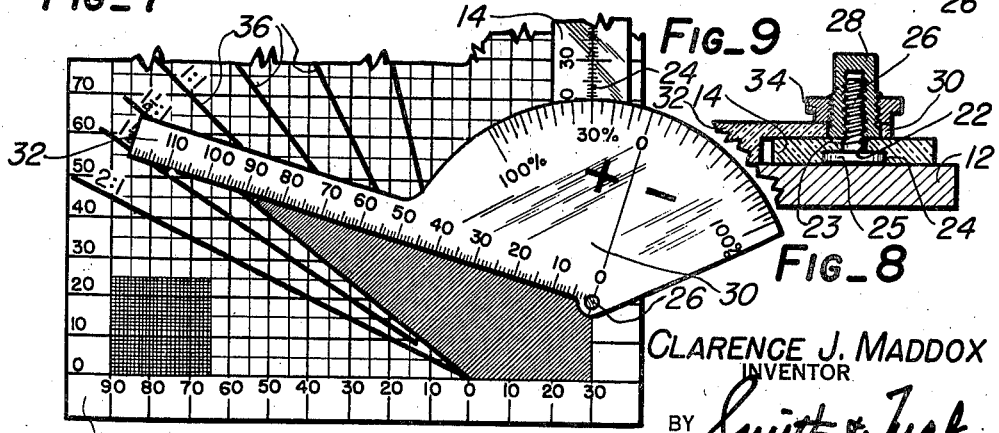
CLARENCE J. MADDOX
INVENTOR
BY Smith & Tuck
ATTORNEYS Patented Feb. 2, 1943

2,309,855

UNITED STATES PATENT OFFICE 2,309,855

SLOPE REDUCING BOARD

Clarence J. Maddox, Seattle, Wash.

Application May 16, 1942, Serial No. 443,223

3 Claims. (Cl. 33—97)

My invention relates to a slope reducing board and, more particularly, to geometrical instruments of the type useful to surveyors in determining calculations of field conditions.

There has been a long-felt need in the field of surveying for a computer or scaled instrument to which may be applied certain known data and with which certain unknown data or quantities may be determined. More specifically, there has been a long-felt need by surveyors of an instrument which will coordinate certain known surveying data with relation, as one specific use, to the proper placement of slope stakes in laying out upon the actual profile ground surface the slope of cut and fill required in a particular road construction problem. Such tools or instruments as have been available are usually complete instruments in themselves and include many of the details of a surveyor's level with the usual supporting base or tripod, to the end that they are clumsy, heavy and one additional piece of cumbersome equipment to be taken onto a job and which, with all of their complexity, do not remove the element of trail and error under most circumstances. There is no known computer that will indicate with accuracy a slope stake point.

Having in mind the defects of the prior art surveying instruments, it is an object of my invention to provide a computer for surveyors that will simply indicate slope stake points or cross-section data and that is simple to operate and readily provides complete data about a specific problem.

Another object of my invention is to provide, in a computing instrument, adjustable elements which readily lend themselves to movement in accordance with data applied to them for the visual expression of certain desired but unknown data.

A further object of my invention is the provision of a reducing board for use in calculating side slope cut or fill slope data in the operation of laying out a roadway.

The foregoing objects and others ancillary thereto I prefer to accomplish as follows:

According to the preferred embodiment of my invention, I provide a work surface subdivided in both axes and with which is associated a swingable arm. Specifically, the work surface is mounted upon a work board along the horizontal axis of which is movable a slidably mounted carrier bar. Pivotally mounted upon the carrier bar is a scale arm which is swingable over the face of the work board. The swingable arm has an associated protractor for use in adjusting the arm to angles across the coordinates of the work surface. The scale arm and the protractor are a unit and pivoted to the carrier by a lockable pivot in order that determined angular positions may be maintained when desired. The pivot is slidable with relation to the vertical axis of the work surface to variously position the scale arm and protractor vertically with relation thereto.

The novel features that I consider characteristic of my invention are set forth with particularity in the appended claims. The invention itself, however, both as to its organizations and its method of operation, together with additional objects and advantages thereof, will best be understood from the following description of a specific embodiment when read in connection with the accompanying drawings, in which Figure 1 is a plan view of my computing instrument, Figures 2 and 3 are fragmentary cross-sectional views taken on lines 2—2 and 3—3 respectively of Figure 1, Figures 4 and 5 depict typical problems that are solvable by my computing instrument, Figure 6 is an exploded perspective view of the parts of my instrument, Figure 7 is an enlarged detail view illustrating the manner in which an end of the carrier is tensioned on the work board, Figure 8 is an enlarged detail view in cross section of a lockable pivot employed between the scale arm and the carrier of my instrument, and Figures 9 and 10 are fragmentary plan views of my measuring instrument as set to solve the problems graphically shown in Figures 4 and 5.

A measuring instrument, to overcome the defects hereinbefore enumerated, must have at least two totally distinct characteristics; it must be capable of withstanding hard use and it must also be easy to operate and to coordinate to known data in the solving of a specific problem. Accordingly, a preferred embodiment of my invention, referring to Figures 1 and 6 of the drawings, is constituted by a base board upon which is spread certain data and associated with which are the movable parts of the instrument. The work board is designated by the numeral 12 and has an upper plane surface which is subdivided in two axes in the manner of graph paper and, usually, the subdivisions are in terms of feet per inch. Along the $x$ axis of this work board, starting from a zero point and extending in both directions in increasing ordinates are distances in terms of feet per inch in a horizontal plane. The y axis is inscribed in like manner with ordinates representing distances in a vertical plane.

Extending along the vertical axis and movable across the horizontal axis is the carrier 14. As shown in Figure 6, the work board 12 is thinned at 16 over which fit the underturned ends 18 and 19 of the carrier 14. In Figure 7, a spring 20 between the end 18 of the carrier and the edge of the board applies tension to the carrier to maintain it in a set position.

Carrier 14 has a slot 22 near its lower end and between the upper end of the slot and the upper end of the carrier a graduated line 24 is displayed, and this line will be subdivided also in terms of cut or fill corresponding to the ordinates of the work surface. The slot 22 has lips 23 that are undercut to provide side grooves or cutout portions 24 to accommodate the head 25 of the screw 26 which is passed through the slot. A bushing or boss 28 is threadedly engaged on the screw. Pivotally fitted around boss 28 at its axis is the protractor segment 30 from one side of which extends the scale arm 32.

It will be seen by this construction that the pivot pin 26 and the boss 28 may be securely clamped in place at any desired position along the length of slot 22 by tightening bushing 28 down against the upper faces of the carrier at the lips of the slot and against the head 25 of pin 26. In this manner the pivot may be fixedly secured as desired.

In order to fix the protractor in any desired relation to the pivot, a lock ring 34 is threadedly engaged around the bushing 28 and presses upon the upper surface of the protractor so that when ring 34 is tightened downwardly it locks the protractor to the carrier 14. The edge of the protractor is shown in the drawings as being divided into percent of side slope, but it will be understood that it may also be divided in degrees of side slope upon the basis of 360 degrees.

The edge of the scale arm 32 in a line with the pivotal axis is subdivided according to the scale of the ordinates of the board for the purpose of reading directly upon the work board or upon it from the work board.

Radiating outwardly and upwardly from the zero point of the x axis are a plurality of lines designated by the numeral 36. Each of these lines represents the angle of repose or angle of side slope of a type of earth composition. For example, the steeper line marked ¼:1 represents the angle of the repose of a fairly solid rock material and progressively this angle of repose is displayed across the board toward the horizontal for various other types of earth material.

Throughout this specification I employ terms which I prefer to define as follows:

The "ground surface" is the actual earth condition found at a given station transversely of a roadway grade line.

A "station" is that point along a roadway grade line at which it is desired to determine the needed cuts or fills in shaping the earth to produce a finished roadway.

The "roadway" is that plane in, on or above the earth at a given station along a roadway grade line in which a finished roadway will lie and in respect to which cut, fill or side slope characteristics are usually computed.

The "cut" at a slope stake is the vertical distance of the profile ground surface at a given station above a proposed roadway level; and similarly the "fill" at a given station is the vertical distance of the profile ground surface there below the proposed roadway level.

The "back slope" or "fill slope" is that angle of cut or fill respectively with regard to a proposed roadway at which the earth material at a given station will stand in repose.

At the intersection of the angle of side slope of the ground surface with the back or fill slope is the "slope stake point" which is that point to be computed and located for the proper placement of slope stakes in directing a desired slope of cut or fill in shaping the earth to form a roadway.

This invention is intended primarily to provide a simple, graphic solution of the problem of slope staking or finding the point on the ground surface where a back-slope stake, or toe-of-fill stake should be set in laying out a roadway.

Secondarily it will facilitate taking cross sections by providing a similar solution of the problem of reducing degrees (or percent) of side slope and a measured slope distance to the vertical and horizontal components.

I will deal with each function separately and will describe the method of procedure by which the use of this reducing board will simplify setting slope stakes and will function with equal ease and simplicity in the taking of cross sections.

SLOPE STAKING

When setting slope stakes there are always three variables. The distance between the toe of back-slope and the center line of the road. The center line to shoulder distance is less than center line to toe of slope distance on account of the ditch, and center line to either will vary on a given subgrade width, due to the widening for curvature. This variable is readily and simply taken care of by sliding member 14 laterally the required number of feet to the right of the zero at the intersection of the various slopes. This establishes the center line at a desired distance from the toe of slope. It will be understood that "shoulder of fill" may be read for "toe of slope," as the operations are equivalent.

The second variable is the fact that on a designed roadway,—one where excavation will balance fill within economic limits of haul—there will be varying heights of cut or fill at the center line at each station at which it is desired to set slope stakes. This variable is satisfied as readily by the simple expedient of sliding the axial center of the protractor member 30 in slot 22 until its circumferential edge will coincide with the required height of cut or fill on the graduations for height of cut or fill on scale 24.

Having thus made the necessary settings to satisfy two of the three variables, the third variable, the percent (or degree) of side slope of the ground line is determined. This is customarily done either with an Abney level, which records the slope in percent, or with a clinometer, which records the slope in degrees. This slope reading is next set on the board by swinging the protractor member 30 until the point on its graduated edge, identical to that determined by actual measurement at the section which is to be slope staked, coincides with the vertical line of scale 24 on member 14.

The mid point of the arc of the protractor member 30 is marked zero and the graduations increase in both directions. The left hand quadrant is marked + (plus) and the right hand quadrant is marked − (minus). The recorded slope measurement is set on the + (plus) quadrant when setting all cut stakes on the uphill side of the center line and all toe-of-fill stakes on the downhill side of the center line. If cut stakes are to be set on the downhill side or toe-of-hill stakes on the uphill side of the center line the — (minus) quadrant must be used.

Using the + (plus) side of the quadrant: specifically the location of the cut or fill stake is found in the following manner: After the necessary settings have been made to satisfy the first two variables mentioned, the ground slope is set on the protractor as determined by field measurement. After the protractor 30 has been secured in this position by the lock pivot 28, 34 the scale arm 32 will intersect the various cut and fill slopes indicated on the graduated board 12.

The point of intersection on the board on any slope (½:1—1:1, etc.) will give the ordinates of the stake to be set; viz: the vertical difference between the grade and the stake to be set and the horizontal distance between the center line and the stake (the sum of the horizontal distances to the right and left of the zero point on the scale of horizontal distances), for the required slope.

The point of intersection on the scale 32 is the slope distance between the center line and the stake to be set. This will be a direct measurement in all cases.

To aid in clarifying the operation of this invention in actual field use I will further break slope staking into the following cases.

1. Sidehill section with cut stake and fill slopes.
2. Through-cut or through-fill sections, where there are two cut or two fill stakes.

*Case 1*

This is illustrated in Figures 4 and 9 of the accompanying drawings, as a simple sidehill section where there is neither cut nor fill at the centerline stake of the proposed roadway. These figures show that the first two variables have been set as required for the section,—viz. center line thirty feet from toe. Member 14 is slid thirty feet right of the toe of slope. There is no cut or fill and protractor 30 is centered at bottom position in slot 22 with its circumferential edge at zero on the cut or fill scale 24.

The side slope of the ground surface has been measured by a previously described instrument (Abney level) and has been found to be 30%. It is desired in this problem to set a cut-stake at the point at which a 1¼:1 back slope will intersect the original ground surface line and to determine the slope distance from the center line to this point and also the vertical difference between this point and the grade line and horizontal distance between the point and the center line.

This ground surface slope is then set on the protractor member (using the + (plus) quadrant). The operator then reads the distance on scale member 32 at the point where the scale intersects the 1¼:1 slope line on the board 12. This setting is shown in Figure 9 and the readings that will be obtained are shown on Figure 4. First he determines that the slope distance is 50.2 feet from center line to the slope stake. Crew members measure this distance and the slope angle is checked at this point and is found to be the same, the other required information is then found on the board; viz. cut 14.4 feet and horizontal 48.0 (18.0 feet plus 30.0 feet). This example has been shown as a cut section. If it were to be a toe-of-fill stake to be set instead of a cut stake, the various factors would be the same except that the slope distance would be measured downhill instead of uphill.

*Case 2*

Figure 10 shows the various members set similar to the above except that there is a 20.0 foot center line cut, as indicated by the center of the protractor member 30 being slid upward in slot 22 until its circumferential edge coincides with 20.0 feet on scale 24 on member 14.

This case must be divided into two parts: First, for the upper side of a through cut or the lower side of a through fill, the + (plus) quadrant must be used. Second, for the lower side of a through cut, or the upper side of a through fill, the — (minus) quadrant must be used.

For the first part: the left side of Figure 5 as viewed shows that when the three variables were met, using the + (plus) quadrant, that the slope distance from center line to stake is 91.7 feet and that the vertical difference is 46.3 feet. The horizontal distance is 87.8 feet (57.8 feet plus 30.0 feet). The second part is shown by the right hand side of Figure 5. With the variables the same the — minus side of the quadrant 30 is used to set the cut stake on the lower side of the center line (not shown). Using this the lower slope distance is found to be 41.8 feet and the vertical difference is found to 8.0 feet. The horizontal distance is found to be 40.0 feet which is 10.0 feet plus 30.0 feet.

Figure 5 shows a center line cut of 20.0 feet, however, by turning the drawing top side down so that it will appear to be a 20.0 foot fill, it is readily seen that all vertical and horizontal distances remain the same. It is equally obvious that the longer slope distance is measured to the high side of a cut or the low side of a fill. The shorter slope distance is the opposite of the above.

CROSS SECTIONING

When taking cross sections the center line on member 24 is made to coincide with the zero horizontal distance on the bottom of board 12 and the axial center of the protractor is moved to the bottom of the slot with the circumferential edge is at zero on scale 24.

The field crew measures, for each side of each cross section, the side slope and slope distance to each break on the ground surface. The side slope is set on the + (plus) quadrant and at the distance (on the slope distance scale), which has been measured, is the point on the board which will give the vertical and horizontal components of the slope angle and slope distance. These are recorded in the usual manner, the recorder assigning a plus or minus symbol, as required, to the vertical reading. Each ground break is a similar problem and each is solved and recorded in its turn in the above manner.

Throughout the device such parts as the protractor segment 30, the scale arm 32, and the carrier 14 are shown as being transparent for the purposes of viewing directly through them such parts as are one under the other. Transparency of these parts is not essential, as in those cases where metal is employed to form the various elements, a window may be provided for viewing data that would otherwise be covered and obscured.

I claim:

1. A slope reducing board, comprising: a rectangular work board having a subdivided right rectangular chart thereon, the zero point of the $x$ axis of said chart being located intermediate the ends of the $x$ axis, a plurality of angle-of-slope-lines radiating across the chart to one side of said zero point, a pivot carrier on said board movable along the $x$ axis of the chart to the side of said zero point away from said angle-of-the-slope-lines, a pivot on said carrier movable along the $y$ axis of the chart, an arcuate protractor plate swingable upon said pivot and having its curved edge scaled to indicate the set thereof relative an axis of the work board, and a scale arm on said plate having its scaled edge radial with the axis of the pivot and adapted by its length to intersect said angle-of-slope-lines.

2. A slope reducing board, comprising: a rectangular work board having a subdivided right rectangular chart thereon, a plurality of angle-of-slope-lines radiating from the juncture of the $x$ and $y$ axes of the chart and spread on the face thereof, a pivot on said board on the opposite side of said zero point from said angle-of-slope-lines, an arcuate protractor plate swingable on said pivot and having its curved edge scaled to indicate the set thereof relative an axis of the work board, and a scale arm on said plate having a scaled edge radial with the axis of the pivot and adapted by its length to intersect said angle-of-slope-lines.

3. A slope reducing board, comprising: a rectangular work board having a subdivided right rectangular chart thereon, the zero point of the $x$ axis of said chart being located intermediate the ends of the $x$ axis, a plurality of angle-of-slope-lines radiating from one side of said zero point across the chart, a carrier bar on said work board lying parallel to the $y$ axis of said chart and movable along the $x$ axis of the chart to the side of said zero point away from said angle-of-slope-lines, said carrier bar having an elongated slot near its lower end, a pivot on said carrier bar movably mounted in said slot, a protractor segment swingable on said pivot and having its curved edge scaled, and a scale arm on said segment having a scaled edge radial with the axis of the pivot and adapted to lie on said chart in a manner to intersect said angle-of-slope-lines.

CLARENCE J. MADDOX.